United States Patent [19]

Person

[11] Patent Number: 5,295,141
[45] Date of Patent: Mar. 15, 1994

[54] SENSING AND RESPONDING TO INVALID STATES IN LOGIC CIRCUITRY

[75] Inventor: George A. Person, Phoenix, Ariz.

[73] Assignee: Bull HN Information Systems Inc., Phoenix, Ariz.

[21] Appl. No.: 629,802

[22] Filed: Dec. 19, 1990

[51] Int. Cl.$^5$ .............................................. G01R 31/28
[52] U.S. Cl. .................................... 371/22.1; 371/15.1
[58] Field of Search ........................... 371/22.1, 15.1; 324/158 R

[56] References Cited

U.S. PATENT DOCUMENTS 3,976,972  8/1976  Aman ................... 371/57.1
4,059,749  11/1977  Feilchenfeld .............. 371/57.1
4,556,976  12/1985  Howarth ................. 371/22.1

Primary Examiner—Charles E. Atkinson

[57] ABSTRACT

In order to prevent a logic circuit including a multistage temporary storage array having both valid and invalid state combinations from locking up in an inadvertently entered invalid state and from alternating between invalid state combinations, support logic circuitry is employed which is configured to force the array back to a valid state combination. The forcing operation may be alternatively undertaken immediately or in synchronism with the next succeeding clock pulse following entry into the invalid state combination. A specific valid state combination to be entered following entry into a specific invalid state may be predetermined.

6 Claims, 5 Drawing Sheets

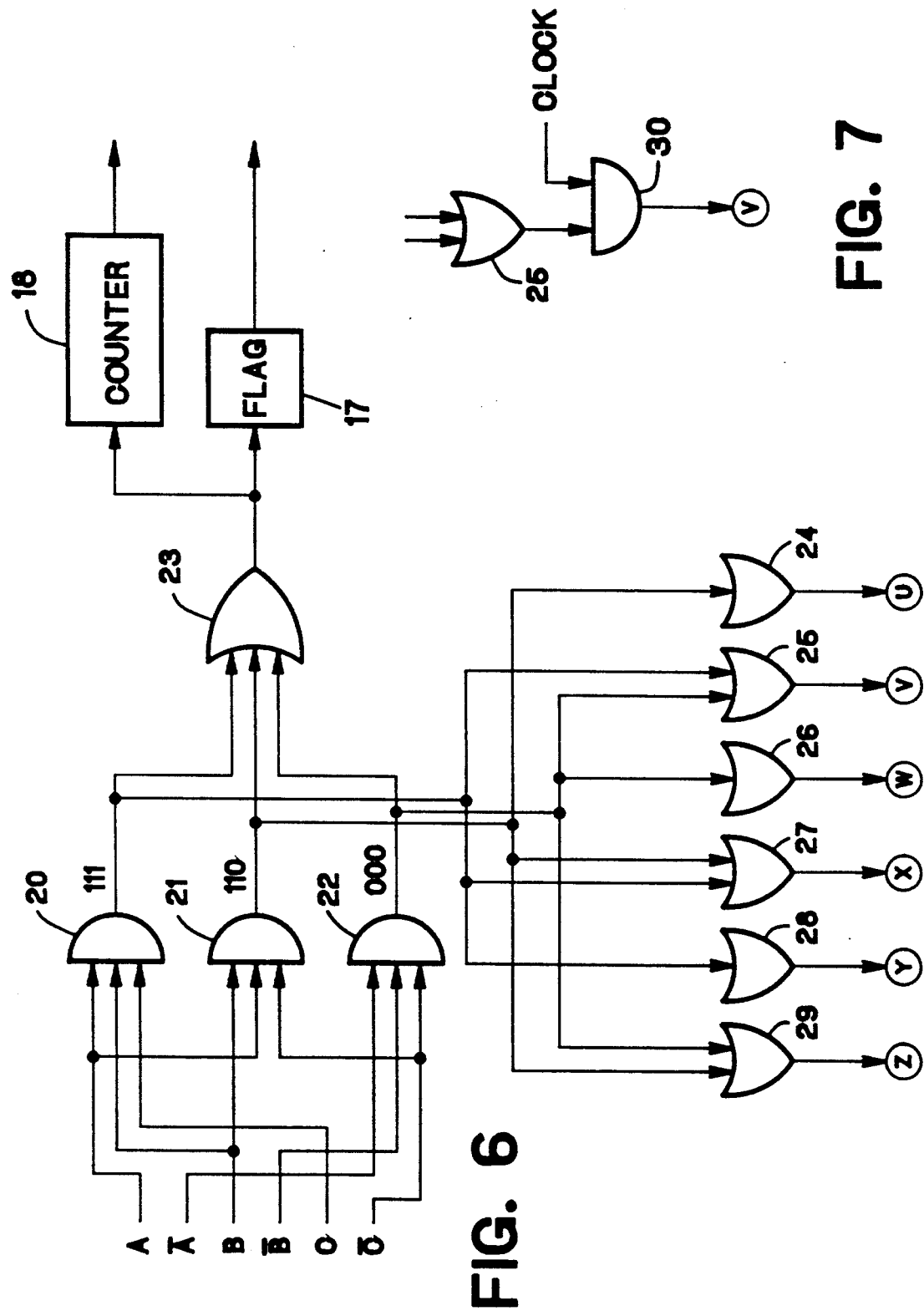

SENSING AND RESPONDING TO INVALID STATES IN LOGIC CIRCUITRY

FIELD OF THE INVENTION

This invention relates to the art of logic circuitry and, more particularly, to an error correcting feature which prevents the lockup of logic circuitry in invalid states.

BACKGROUND OF THE INVENTION

Multi-stage logic circuitry including flip-flops, a counter for example, may be designed to sequence into various state combinations dependant upon the immediately previous state combination and whether an input signal is logic "1" or logic "0" when a clock pulse is applied to the circuitry. Such logic circuitry might be used, merely as an example, to provide control signals necessary to step through execution of an instruction. It is not unusual that logic circuitry of this type will have both a plurality of valid state combinations and one or more invalid state combinations, i.e., state combinations which should never be entered. Under some circumstances (e.g., electrical noise, transient alpha particle, etc.), it is possible for such logic circuitry to temporarily (or even "permanently" until re-initialized) "lock up" in an invalid state or loop among invalid states. This elusive condition (whose presence is often challenging to "prove") can be the source of difficult-to-troubleshoot transient errors in the system incorporating the subject electronic circuitry and should be eliminated for reliable operation.

OBJECTS OF THE INVENTION

It is therefore a broad object of this invention to provide improved logic circuitry having valid and invalid state combinations.

It is another object of this invention to provide such logic circuitry which is invulnerable to lockup in an invalid state and to looping among invalid states.

It is a more specific object of this invention to provide such logic circuitry which serves to immediately steer the logic circuitry out of an invalid state into a predetermined valid state and which optionally provides an indication and/or record of the invalid state occurrence.

SUMMARY OF THE INVENTION

Briefly, these and other objects of the invention are achieved by the incorporation of support logic circuitry which is configured to force the array back to a valid state combination. The forcing operation may be alternatively undertaken immediately or in synchronism with the next succeeding clock pulse following entry into the invalid state combination. A specific valid state combination to be entered following entry into a specific invalid state may be predetermined.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 6 is a logic diagram of certain key elements in the modified circuitry of FIG. 5; and FIG. 7 is an example of a further modification to the circuitry of FIG. 5 by which a delay feature is obtained.

DESCRIPTION OF THE PREFERRED EMBODIMENT(S)

Figure 1:
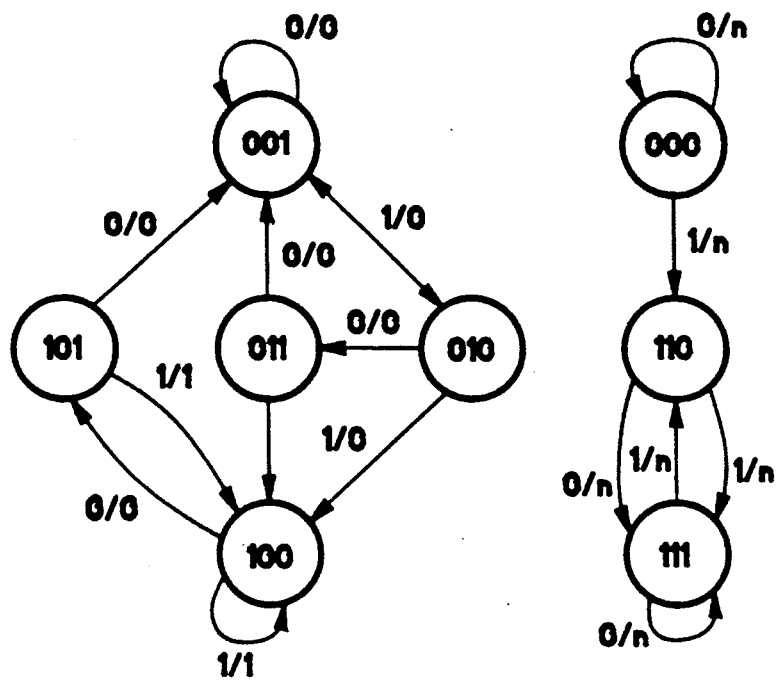
FIG. 1 is a state combination diagram for logic circuitry in which certain state combinations are invalid.

Referring now to FIG. 1, there is shown the state combination diagram for an exemplary three-stage logic circuit, including flip-flops A, B and C, in which state combinations (hereinafter, "states") 000 (all three flip-flops reset), 110 (only flip-flop C reset) and 111 (all three flip-flops set) are invalid and should never be entered. It will be immediately clear that if, for example, state 000 is entered (perhaps as a result of electrical noise, an alpha particle or some other transient condition), the circuit represented by the state diagram will lock up; there is no way out. Particularly noted will be the invalid condition in which the logic circuitry, once inadvertently having entered invalid state 110 or state 111, simply alternates between these invalid states, again with no way out. (As will become more apparent below, the "fraction" logic representations placed intermediate the length of the linking arrowed lines indicate the logic condition of an input signal and an output signal at the occurrence of a clock pulse.)

Figure 2:
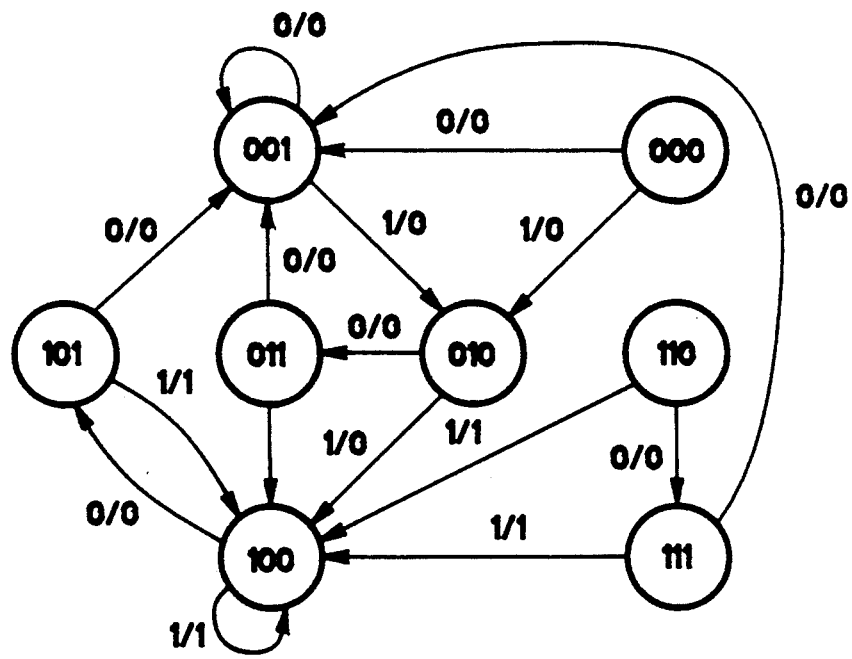
FIG. 2 is a state combination diagram for exemplary logic circuitry to which the principles of the subject invention are applicable.

Now, consider the state combination diagram of FIG. 2 which is similar to that of FIG. 1, but represents logic circuitry incorporating the best practice of the prior art. If the circuitry enters invalid state 000, it returns to valid state 001 at the next clock pulse if the input signal is logic "0" and returns to valid state 010 if the input signal is logic "1". If the circuitry enters invalid state 111, it returns to valid state 001 at the next clock pulse if the input signal is logic "0" and returns to valid state 100 if the input signal is logic "1". However, if the circuitry enters invalid state 110, it returns to valid state 100 if the input signal is logic "1", but enters invalid state 111 if the input signal is logic "0". Nonetheless, as previously noted, it will, with the occurrence of the next clock pulse, proceed from invalid state 111 to either valid state 001 or valid state 100. Thus, the worst case condition is that the circuitry will return to a valid state within two clock pulses and cannot lock up in a single invalid state or alternate among invalid states.

Figure 3:
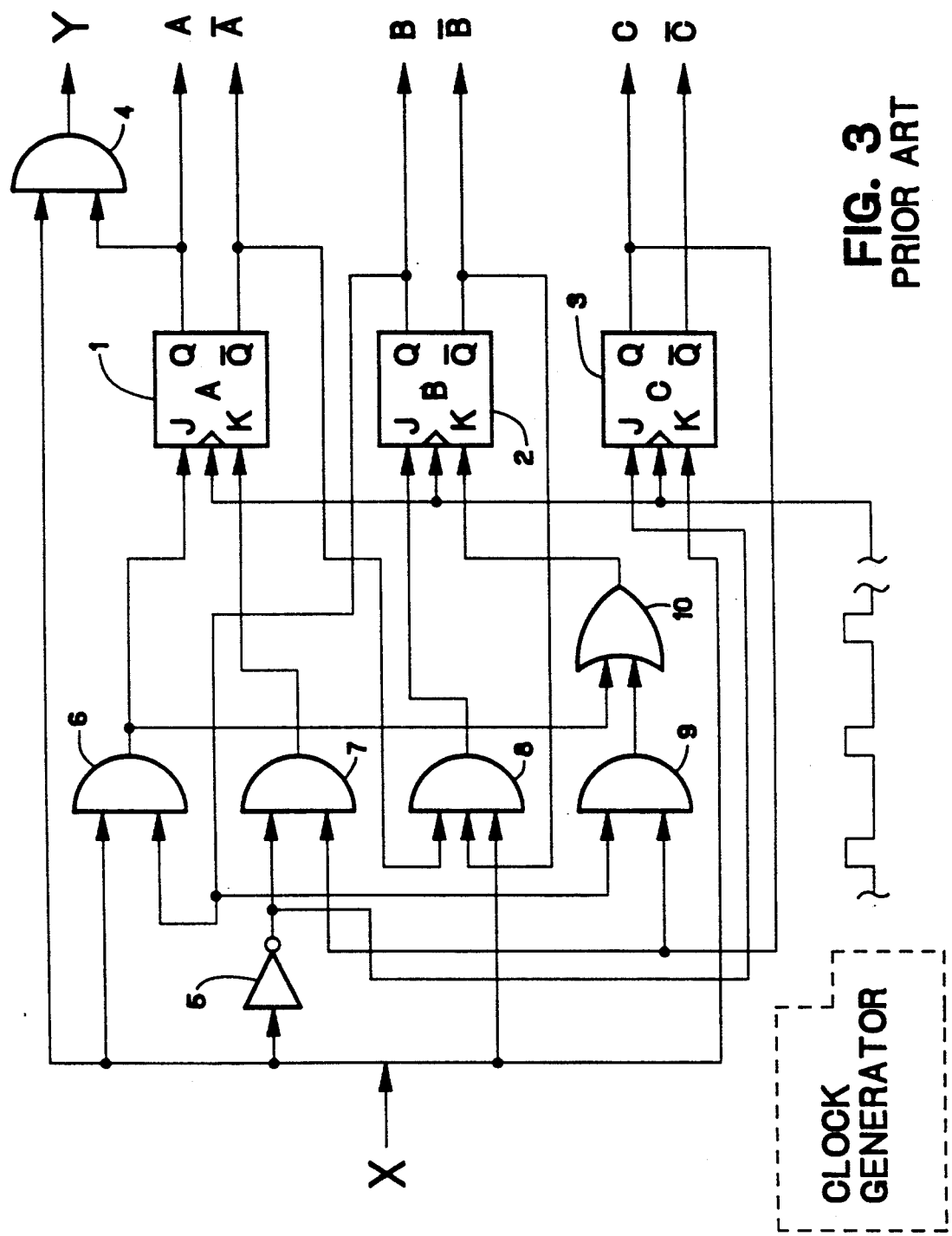
FIG. 3 is a logic diagram illustrating exemplary logic circuitry according to the best prior art practice in which the logic circuitry is inevitably steered out of any invalid state within no more than two clock pulses.

Consider now the logic diagram of FIG. 3 in which the principles of the best prior art practice are realized in an exemplary embodiment. Specifically, the circuitry of FIG. 3 achieves the exact state combination characteristics shown in FIG. 2 by incorporating an input/feedback circuit which takes into account not only the valid states, but also the invalid states and inevitably steers an invalid state back to a valid state. The three stage circuit includes conventional JK flip-flops 1 (flip-flop A), 2 (flip-flop B) and 3 (flip-flop C) which, in the example, trigger on the positive-going transition of the clock pulse. As is well known to those skilled in the art, the "new" state of a JK flip-flop (the exemplary temporary storage unit) is governed by the input signals to the J and K inputs, and also to its current state, upon the occurrence of a clock pulse transition (say, from "0" to "1" in the example). More particularly, the truth table of a JK flip-flop is as follows:

| INPUT | | NEW STATE |
|---|---|---|
| J | K | ($Q_{n+1}$) |
| 0 | 0 | $Q_n$ |
| 1 | 0 | 1 |
| 0 | 1 | 0 |
| 1 | 1 | $Q_n$ |

In the exemplary circuit, in addition to the outputs A, A-bar, B, B-bar, C, C-bar available from the flip-flops 1, 2, 3, there is an output Y which is dependent on the state of flip-flop 1 and the input signal X to the logic circuitry. This is achieved by driving the AND-gate 4 with the Q output of flip-flop 1 and the input signal X. The input/feedback circuitry to the JK flip-flops 1, 2, 3 is interconnected according to the invention and includes inverter 5, two input AND-gates 6, 7, 9, three input AND-gate 8 and two input OR-gate 10.

The inverter 5 is driven by the input signal X and drives (X-bar) one input to AND-gate 7 and the J input to flip-flop 3. The input signal X is applied to one input each of AND-gates 6, 8 and 9. The Q output of flip-flop 2 is connected to the other inputs of each of the AND-gates 6 and 9. The Q-bar output of flip-flop 1 is connected to another input to AND-gate 8, and the Q output of flip-flop 3 is connected to the other inputs of each of the AND-gates 7 and 9. The Q-bar output of flip-flop 2 is connected to the remaining input to AND-gate 8 which drives the J input to flip-flop 2. AND-gate 6 drives the J input to flip-flop 1 and also one input to OR-gate 10. AND-gate 8 drives the J input to flip-flop 2, and AND-gate 9 drives the other input to the OR-gate 10 which, in turn, drives the K input to flip-flop 2.

Those skilled in the art will recognize that this input/feedback circuitry is somewhat more complex than that necessary to achieve the controlled sequence through the valid states represented in FIG. 1, i.e., according to the prior art. However, this input/feedback circuitry realizes the combination state diagram of FIG. 2 by which the flip-flops 1, 2, 3, if they ever enter an invalid state, are inevitably steered back to a valid state in no more than two clock pulses and cannot lock up into an invalid state or alternate between invalid states.

Assume first that the flip-flops are in a valid state, say 101, and that the input signal X is a logic "0". AND-gates 6 and 8 are disabled by X, and AND-gate 9 is disabled by B which is at logic "0". Neither input to OR-gate 10 is at logic "1" so that it is also disabled. However, AND-gate 7 is fully enabled by X-bar and C. Thus, the respective J, K inputs to the flip-flops 1, 2, 3 are 01, 00, 10 such that, upon the next occurrence of the clock pulse, the states of the flip-flops 1, 2, 3 will shift to 001 which is correct according to FIG. 3.

Now, assume, for example, that the flip-flops, for whatever reason, have entered invalid state 000 and that the input signal X is logic "1". AND-gate 7 is disabled by X-bar, and the J input to flip-flop 3 is logic "0", both being driven by the inverter 5. AND-gate 8 is fully enabled, and AND-gates 6 and 9 are disabled by C such that OR-gate 10 is disabled. Therefore, the respective J, K inputs to flip-flops 1, 2, 3 are 00, 10 and 01. Upon the occurrence of the next clock pulse, the states of the flip-flops 1, 2, 3 will shift to 010 which is correct according to FIG. 3 and steers the circuitry back to a valid state. However, if the input signal X had been a logic "0", the state of flip-flops 1, 2, 3 would have been steered to invalid state 111 and, upon the next succeeding clock pulse, either to valid logic state 001 (X="0") or to valid logic state 100 (X="1").

The remaining combinations may be similarly verified. Those skilled in the art will understand, of course, that the input/feedback circuitry necessary to achieve automatic recovery from an invalid state will depend upon the specific configuration and type of multi-stage logic which is subject to assuming both valid and invalid states; however, the principles set forth in the illustrative example of the best prior art practice may be directly followed to achieve that result. A fundamental aspect of these principles is to incorporate an input/feedback circuit which takes into account not only the valid states of a logic module including a multi-stage temporary storage array, but also the invalid states and which inevitably steers an invalid state back to a valid state.

The solution to the basic problem achieved in the manner exemplified by the logic circuit of FIG. 3 is not entirely satisfactory and may not be satisfactory at all in many applications. For example, the valid state reentered after a traverse through one or more invalid states may be inappropriate for the current status of the system; i.e., it might be pseudo-invalid at that instant. Also, the fact of having entered into an invalid state is not noted. Perhaps the most important drawback is that it takes one or more clock cycles to reenter a valid state.

Figure 4:
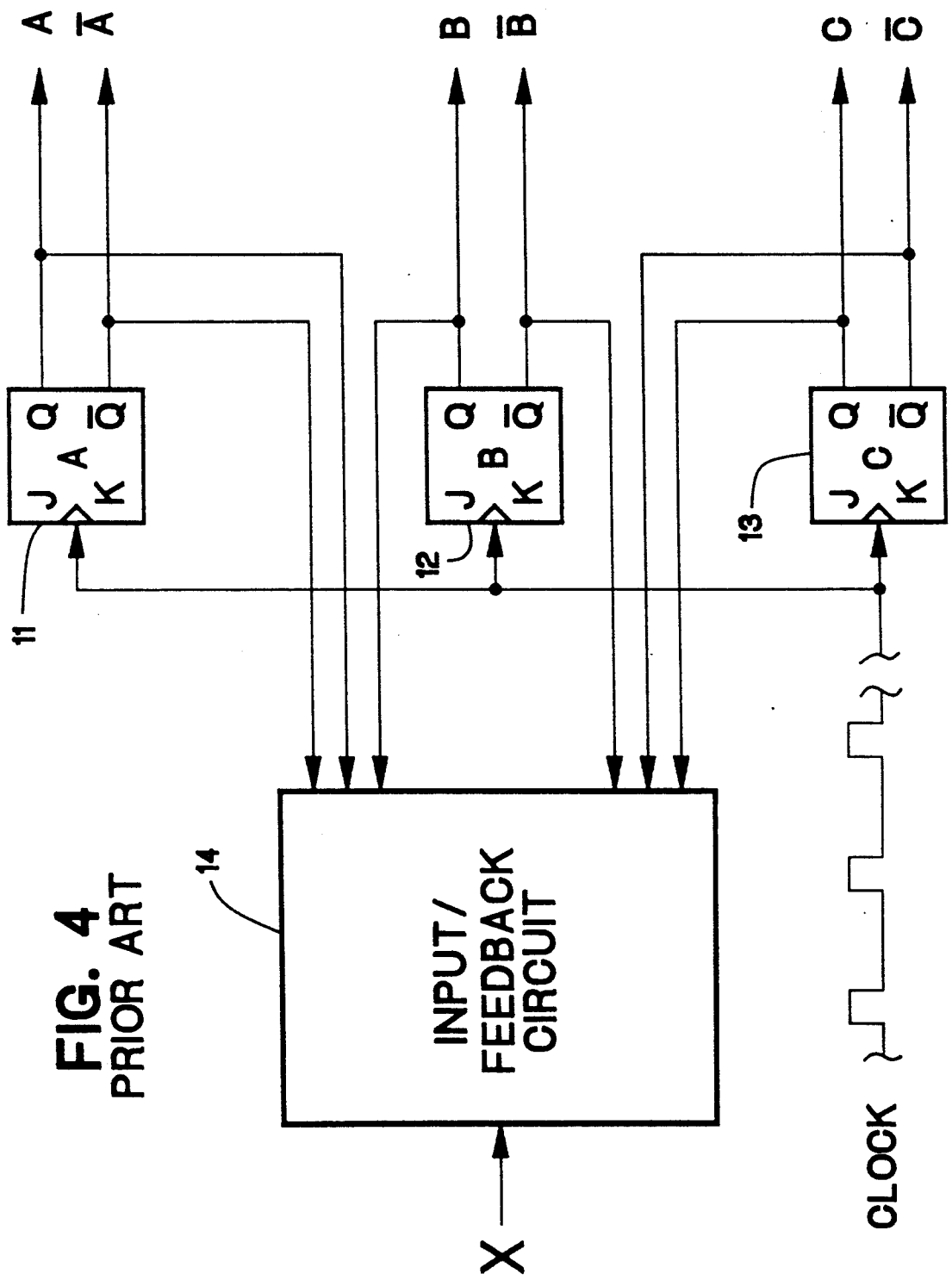
FIG. 4 is a logic/block diagram of a prior art logic circuit which can have either of the state combination diagrams of FIGS. 1 and 2.

Consider now an alternative solution to a problem of the type represented by the state combination diagram of FIG. 1. It would be desirable to both immediately (i.e., before the next clock pulse) get out of an invalid state into a predetermined valid state and also to provide an indication and/or record of the occurrence of an invalid state. Assume that the prior art logic circuit of FIG. 4 (which includes JK flipflops 11, 12, 13, and input/feedback circuit 14) has a state combination characteristic similar to that of FIG. 1 such that it is susceptible to locking up in an invalid state and/or alternating between invalid states. (For that matter, a state combination diagram similar to that of FIG. 2; i.e., the logic designer having accounted for the invalid states as well as the valid states according to the procedure given above, can as well be assumed for the following discussion.)

Figure 5:
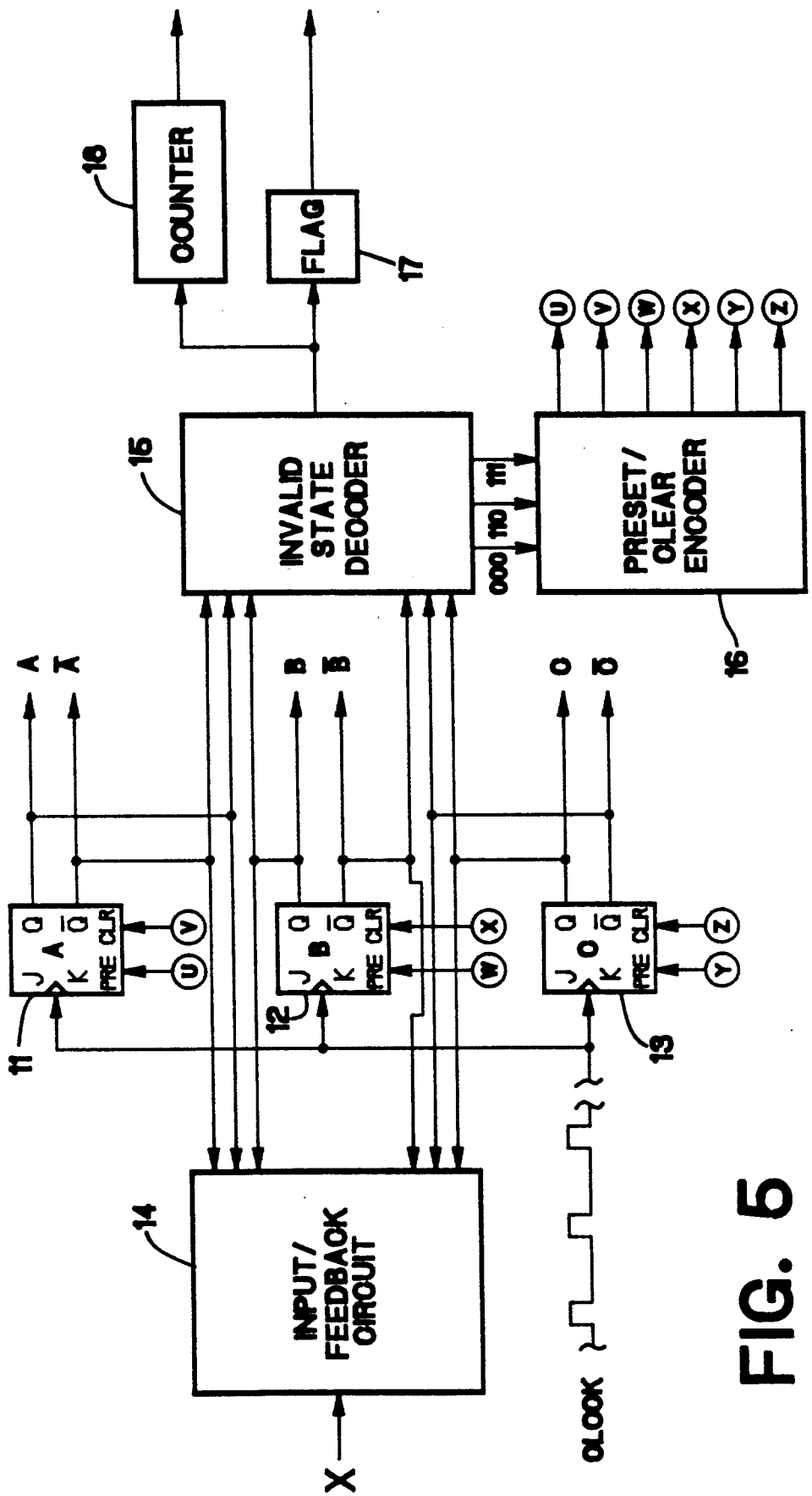
FIG. 5 is a logic/block diagram of the logic circuit of FIG. 4 modified in accordance with the invention to immediately move from an invalid state to a valid state.

The support circuitry shown in FIG. 5 (which illustrates the logic circuit of FIG. 4 modified in accordance with the invention) serves to immediately (before the next clock pulse) transfer the logic circuitry from an invalid state to a predetermined valid state. In addition, if desired, a feature for noting and/or recording the occurrence of one or more entries into an invalid state or states may be provided. It will be observed that the JK flip-flops 12, 13 each have preset and clear inputs which do not require the presence of a clock pulse to establish the flip-flop state. (Those skilled in the art will know that this is a common feature not only of JK flip-flops, but also other flip-flop types.) This characteristic is used to advantage in the invention. In the example to be discussed below, assume that the flip-flops 11, 12, 13 and their support circuitry are intended to constitute a counter which counts serially and repetitively from one to five. Thus, counts six (110), seven (111) and zero (000) are invalid. Further, it is desired that: if invalid count six is sensed, the circuit should be forced to valid count (100); if invalid count seven is sensed, the circuit should be forced to valid count one (001); and if invalid count zero is sensed, the circuit should be forced to valid count two (010).

The signals A, A-bar, B, B-bar, C, C-bar are supplied to an invalid state decoder block 15 which represents straightforward logic to sense invalid state combinations for the flip-flops 11, 12, 13. In the example, these invalid states are (by definition and merely by way of example) 000, 110 and 111. If any one of those invalid states is sensed, an "invalid state" signal is issued to a flag block (which may simply be a flip-flop) to record the event and make the fact of its occurrence available to other system components either immediately or later. The "invalid state" signal is also optionally supplied to counter block 18 in order to develop a record of occurrences. Those skilled in the are will understand that many equivalent implementations of the flag 17 and counter 18 may be realized. For example, the flag 17 might be reset upon interrogation and the count simply saved in software to eliminate the need for the discrete counter 18.

The invalid state decoder block 15 also supplies individual "000, 110, 111 error signals" (i.e., the specific error sensed) to preset/clear encoder block 16. The preset/clear encoder block 16 serves to steer the flip-flops 11, 12, 13 to the desired valid state following the occurrence of a specific invalid state.

The logic circuitry in the invalid state decoder 15 and the preset/clear encoder 16 are straightforward and simple for the example. Referring to FIG. 6, AND-gate 20 is driven by A, B, C and thus is fully enabled if the 111 state is entered. Similarly, AND-gate 21 is fully enabled if the 110 state is entered and AND-gate 22 is fully enabled if the 110 state is entered. The AND-gates 21, 22, 23 drive inputs to OR-gate 23 which therefore supplies the "invalid state" signal to the flag 17, counter 18 or to whatever other circuitry may require this information. Individually, the AND-gates 21, 22, 23 respectively supply the "111, 110, 000 error signals" to the preset/clear encoder 15 which, in the simple example, consists of an array of OR-gates 24, 25, 26, 27, 28, 29.

The OR-gate 24 drives the preset input to flip-flop 11 (FIG. 5). Similarly, the OR-gate 25 drives the preclear input to flip-flop 11, the OR-gate 26 drives the preset input to flip-flop 12, the OR-gate 27 drives the preclear input to flip-flop 12, the OR-gate 28 drives the preset input to flip-flop 13, and the OR-gate 29 drives the preclear input to flip-flop 13.

It will now be clear that if, for example, the invalid state 111 is entered, OR-gates 25, 27, 28 are enabled to respectively cause flip-flops 11, 12, 13 to immediately assume the desired 001 combination. Similarly, the occurrence of invalid state 000 causes OR-gates 25, 26, 29 are enabled to force the 010 combination; and the occurrence of invalid state 110 causes OR-gates 24, 27, 29 are enabled to force the 010 combination.

It may be desirable in a given application to synchronize the return to a valid state combination of the flip-flops 11, 12, 13 with the occurrence of the next clock pulse after the invalid state combination has been entered. As shown in FIG. 7, this may be achieved, for example, by simply adding an AND-gate in line with the output from each of the OR-gates 24, 25, 26, 27, 28, 29. In FIG. 7, the AND-gate 30 is interposed between the OR-gate 25 and the "V" connector to the clear input to the flip-flop 11.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A logic circuit comprising:
   A) a multi-stage temporary storage array having both valid and invalid states;
   B) each stage of said multi-stage temporary storage array including a temporary storage element having both clocked inputs and preset and preclear inputs;
   C) a source of clock pulses;
   D) decoder means for sensing if said temporary storage array has entered into an invalid state and for issuing an output signal if an invalid state is sensed; and
   E) encoder means coupled to said decoder means and to said preset and clear inputs of said multi-stage temporary storage array, said encoder means being responsive to said output signal from said decoder means to issue forcing signals to said preset and clear inputs of said multi-stage temporary storage array whereby said multi-stage temporary storage array is forced to a predetermined valid state.

2. The logic circuit of claim 1 in which each stage of said multi-stage temporary storage array comprises a clocked flip-flop.

3. The logic circuit of claim 1 which further includes delay means for delaying the issuance of said forcing signals until the occurrence of the next succeeding clock pulse.

4. The logic circuit of claim 2 which further includes delay means for delaying the issuance of said forcing signals until the occurrence of the next succeeding clock pulse.

5. A method for preventing a clocked logic circuit having both valid and invalid state combinations from locking up in an inadvertently entered invalid state combination and from alternating between invalid state combinations comprising the steps of:
   A) steering the multi-stage temporary storage array through a normal sequence of valid state combinations upon the occurrence of successive clock pulses; and
   B) forcing the multi-stage temporary storage array from an invalid state to a valid state combination upon entry into the invalid state combination prior to the next succeeding clock pulse after the multi-stage temporary storage array has entered the invalid state.

6. The method of claim 5 in which, in step B), the occurrence of each invalid state combination results in forcing the return of the multi-stage temporary storage array to a predetermined valid state combination.

* * * * *